US008831789B2

(12) United States Patent
Weatherhead et al.

(10) Patent No.: US 8,831,789 B2
(45) Date of Patent: Sep. 9, 2014

(54) GOAL-BASED LOAD MANAGEMENT

(75) Inventors: Norman A. Weatherhead, Ayr (CA); Raymond J. Staron, Chagrin Falls, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 383 days.

(21) Appl. No.: 12/893,722

(22) Filed: Sep. 29, 2010

(65) Prior Publication Data

US 2012/0078432 A1  Mar. 29, 2012

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| G05B 19/18 | (2006.01) |
| G06F 13/00 | (2006.01) |
| G06Q 10/06 | (2012.01) |
| H02J 3/14 | (2006.01) |

(52) U.S. Cl.
CPC . H02J 3/14 (2013.01); G06Q 10/06 (2013.01); Y04S 10/54 (2013.01); Y02E 40/76 (2013.01); Y02B 70/3225 (2013.01); Y04S 20/222 (2013.01); Y04S 10/545 (2013.01)
USPC ............. 700/295; 700/6; 700/286; 700/291; 710/110

(58) Field of Classification Search
USPC ................. 700/295, 6, 286, 291; 710/110
See application file for complete search history.

(56) References Cited

U.S. PATENT DOCUMENTS

| | | | | | |
|---|---|---|---|---|---|
| 4,181,950 | A | * | 1/1980 | Carter, II | 700/291 |
| 4,310,770 | A | * | 1/1982 | Keener et al. | 307/35 |
| 7,373,222 | B1 | * | 5/2008 | Wright et al. | 700/295 |
| 7,580,775 | B2 | | 8/2009 | Kulyk et al. | |
| 7,873,441 | B2 | * | 1/2011 | Synesiou et al. | 700/286 |
| 8,340,832 | B1 | * | 12/2012 | Nacke et al. | 700/295 |
| 8,437,882 | B2 | * | 5/2013 | Craig et al. | 700/295 |
| 8,542,685 | B2 | * | 9/2013 | Forbes et al. | 370/392 |
| 2004/0010324 | A1 | * | 1/2004 | Bednar et al. | 700/6 |
| 2005/0192713 | A1 | | 9/2005 | Weik et al. | |

(Continued)

OTHER PUBLICATIONS

Office Action mailed Feb. 25, 2013 for U.S. Appl. No. 12/893,715, 12 pages.

(Continued)

Primary Examiner — Mohammad Ali
Assistant Examiner — Ziaul Karim
(74) Attorney, Agent, or Firm — Amin, Turocy & Watson, LLP

(57) ABSTRACT

Systems and methods are provided that facilitate dynamic load shedding control in an industrial environment in accordance with one or more production goals provided by a user. One or more production goals for system of industrial load devices (e.g., target product output, desired maximum peak energy demand, and the like) can be provided to a policy engine, which generates goal-based criteria in a standardized format based on the production goals. The goal-based criteria can be provided to a load modulation component, which uses the criteria to calculate load shed priorities for respective load devices on the system designed to ensure that the one or more specified production goals are achieved. The load modulation component can also generate a load shed schedule or load shed criteria used to determine when or under what conditions load shedding is to be initiated in order to achieve the one or more production goals.

20 Claims, 8 Drawing Sheets

(56) References Cited

U.S. PATENT DOCUMENTS

| | | |
|---|---|---|
| 2007/0143046 A1 | 6/2007 | Budike |
| 2008/0015742 A1 | 1/2008 | Kulyk et al. |
| 2008/0272934 A1 | 11/2008 | Wang et al. |
| 2010/0019574 A1* | 1/2010 | Baldassarre et al. ............ 307/23 |
| 2010/0070103 A1* | 3/2010 | Fleck et al. .................. 700/296 |
| 2010/0106641 A1 | 4/2010 | Chassin et al. |
| 2011/0119420 A1* | 5/2011 | Hata ............................ 710/110 |
| 2012/0010758 A1* | 1/2012 | Francino et al. .............. 700/291 |
| 2013/0197706 A1* | 8/2013 | Losee et al. .................. 700/295 |

OTHER PUBLICATIONS

Office Action mailed Oct. 22, 2012 for U.S. Appl. No. 12/893,715, 11 pages.

* cited by examiner

GOAL-BASED LOAD MANAGEMENT

TECHNICAL FIELD

The claimed subject matter relates generally to energy load management, and more particularly to a modular goal-based energy management architecture that dynamically modulates load shed and re-application priorities in accordance with defined production goals.

BACKGROUND

Modern industrial facilities can comprise a large number of machines operating independently or in conjunction to manufacture a product or manage a process. These can include such high-powered machines as welders, multi-ton stamping presses, pumps, machining robots, load bearing conveyors, mixers, and the like. Given the power of their operations, it can require a large amount of energy to drive these machines. Consequently, the cost of energy consumption is one of the largest expenses faced by an industrial enterprise. For this reason, plant engineers strive to efficiently manage their plants' energy loads to ensure that energy is consumed as efficiently as possible.

The need to optimize a facility's energy usage is balanced against the facility's primary goal of manufacturing a desired product at a rate commensurate with current business concerns. It is therefore important at all times to weigh the costs and benefits of adjusting production output in view of the corresponding changes in energy utilization. However, this cost-benefit analysis is often a function, not only of the direct relationship between product output and energy utilization, but of current business objectives or goals. These business objectives are rarely static, but instead vary based on such factors as current demand for a particular product, an amount of excess product currently in stock, current budgetary restrictions, real-time energy costs, revenue generated by a particular product, or other such considerations. Decisions regarding when and how long to run a particular machine must take into account these varying conditions.

Given the many and varied considerations that must be examined in order to optimize energy utilization and product output in a facility, there is a need for a load management solution that can schedule and prioritize load usage in a facility based on one or more specified production goals. It is also desirable that such a load management system can be easily integrated with a new or existing general control system without the need for complicated custom programming or specialized instrumentation.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

One or more embodiments of the present disclosure relate to a goal-based load management architecture that dynamically schedules and prioritizes load shedding and re-application in accordance with one or more production goals provided to the system. The architecture can include a policy engine and a load modulation component. The policy engine can receive information specifying one or more production goals and generate standardized criteria output based on this information. Using the criteria generated by the policy engine, the load modulation component can calculate load shedding and/or re-application priorities for one or more loads on an energy distribution system. These load shedding and/or re-application priorities can be used to shed or re-apply the loads in a prioritized manner in accordance with the production goals. The load modulation component can also generate load shed scheduling information defining times or conditions when load shedding and load re-application are to take place. In this way, load shed and load application strategies can be dynamically reconfigured as production goals change.

The goal-based load management components can operate in conjunction with a modular load management architecture integrated within a general industrial controller (e.g., a PAC) in the form of predefined load management modules having built-in load management functionality. This architecture can include at least one feeder module and at least one load module deployed within the controller that collect, respectively, energy supply data and energy demand data measured from an energy distribution system and provided to the controller. The feeder modules and load modules exchange both the measured data and additional calculated energy data via a virtual energy bus that links the feeder modules with the load modules by virtue of a common bus reference. The modules and the virtual energy bus can comprise configurable attributes that allow the modules and bus to be tailored for a particular energy distribution system without the need for extensive custom programming. The feeder modules and load modules of this modular load management architecture can be configured by the load modulation component to manage system loads in a way that achieves or optimizes the production goals defined by the user.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
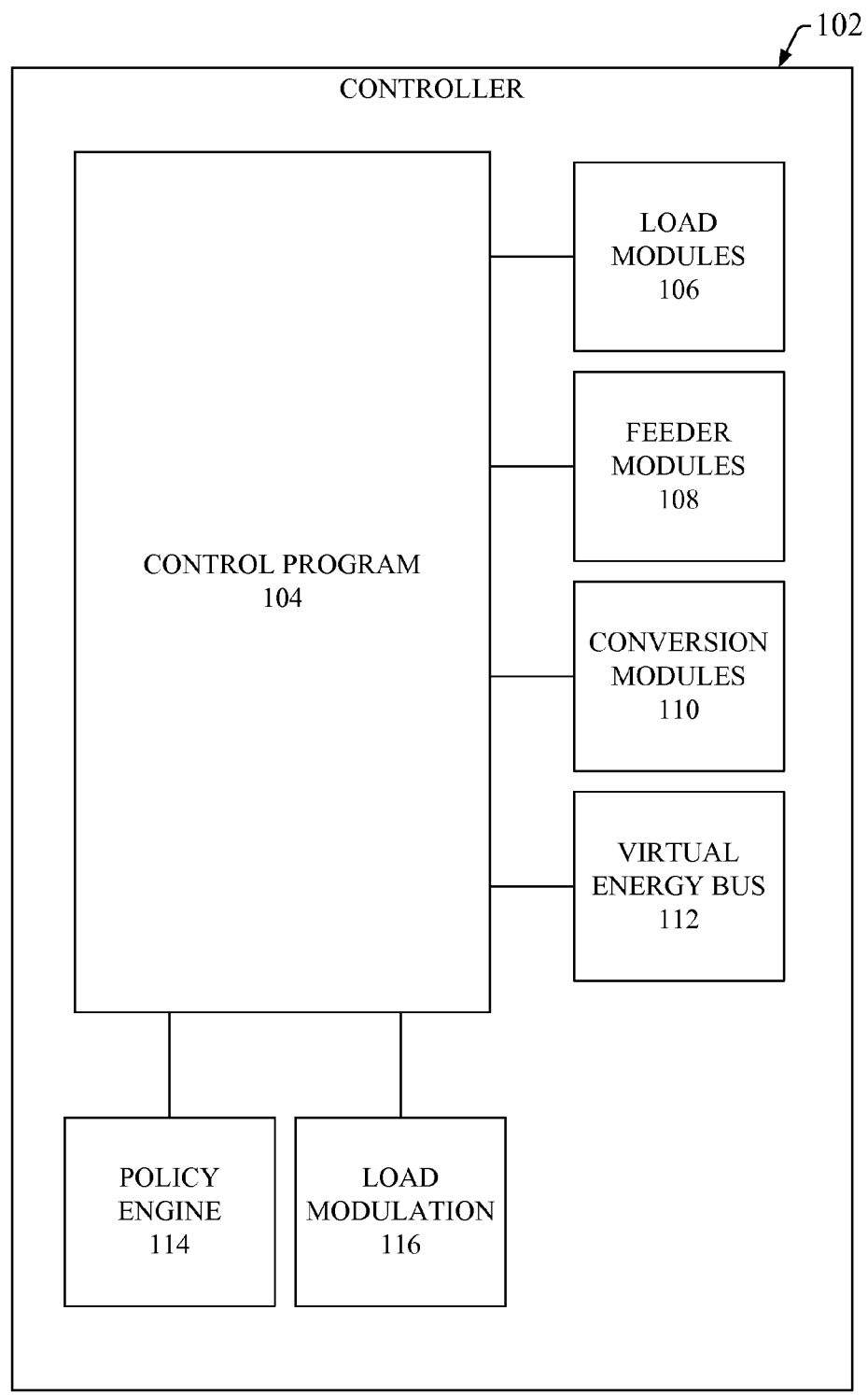
FIG. 1 depicts an exemplary architecture for integrating load management functionality with a new or existing control system.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

It is noted that as used in this application, terms such as "component," "module," "model," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

FIG. 1 depicts an exemplary architecture for integrating load management functionality with a new or existing control system. Controller 102 can comprise an industrial controller, such as a programmable automation controller (PAC), that executes a control program 104 to facilitate automation and control of at least a portion of a process within an industrial facility. Control program 104 can comprise any conceivable type of code used to process input signals read into the controller and to control output signals from the controller, including but not limited to ladder logic, sequential function charts, function block diagrams, or structured text. Data read into or generated by controller 102 can be stored in memory addresses within controller memory, which can include native memory or removable storage media. Exemplary controller 102 can be equipped with one or more input and/or output modules that communicate with one or more field devices to effect control. The input and/or output modules can include digital modules that transmit and receive discrete voltage signals to and from the field devices, or analog modules that transmit and receive analog voltage or current signals to and from the devices. The input and/or output modules can communicate with the controller processor over a backplane such that the digital and analog signals can be read into and controlled by the control program executed by the controller. Controller 102 can also communicate with field devices over a network using, for example, a communication module or an integrated networking port. Exemplary networks over which controller 102 can communicate with field devices can include the Internet, Intranets, Ethernet, DeviceNet, ControlNet, Data Highway and Data Highway Plus (DH/DH+), Remote I/O, Fieldbus, Modbus, Profibus, wireless networks, serial protocols, and the like. It is to be appreciated that controller 102 is not limited to the above specifications, and can include virtually any type of controller used to control an industrial process.

Controller 102 can include and/or interact with the goal-based load management components of the present invention to facilitate integration of energy management within the general control architecture. The goal-based load management components can include a policy engine 114 and a load modulation component 116. Policy engine 114 is designed to receive and process information specifying desired production or energy utilization goals. These goals can include a desired target output for a product, a preference to favor product output over energy conservation (or vice versa), an desired maximum peak load, a preference to favor one particular product over another in the event of load shedding, or other such objectives. Policy engine 114 processes this goal information and generates criteria output in a standardized format, which is then published to the load modulation component 116. Load modulation component utilizes the criteria generated by the policy engine to schedule and prioritize shedding and re-application of loads on the system in accordance with the production goals. Load modulation component 116 can, either directly or indirectly, leverage the native I/O of controller 102 to effect shutdown, disconnection, or activation of load devices in accordance with the policy criteria generated by policy engine 114.

The goal-based load management techniques of the present disclosure, and in particular the functionality of the policy engine 114 and the load modulation component 116, are described herein in connection with an exemplary general load management architecture that integrates or interacts with control program 104. This general load management architecture can include a number of modular load management components, including load modules 106, feeder modules 108, conversion modules 110, and at least one virtual energy bus 112. These modules can comprise structured software modules deployed within controller 102 that execute autonomously or in conjunction with control program 104 to effect management of energy supply and utilization within the facility. The load management modules can include inputs, outputs, and configurable parameters having predefined functions that, together with analytical functionality built into the modules, allow energy management for one or more energy distribution systems to be easily configured without the need to write complicated custom code. Moreover, by providing an architecture for load management that can be integrated within a general industrial control solution, the load management modules can leverage existing controller I/O to effect management of a facility's energy loads without requiring specialized instrumentation. It is to be appreciated that, although the load management modules are depicted in FIG. 1 as residing on a single exemplary controller 102, the modules can be deployed in multiple controllers to yield a distributed load management system. The modular load management architecture described above is only intended to be an exemplary context in which to implement the features of policy engine 114 and load modulation component 116, and that the goal-based load management techniques described herein can be implemented within any suitable control architecture to facilitate dynamic policy driven load prioritization.

Figure 2:
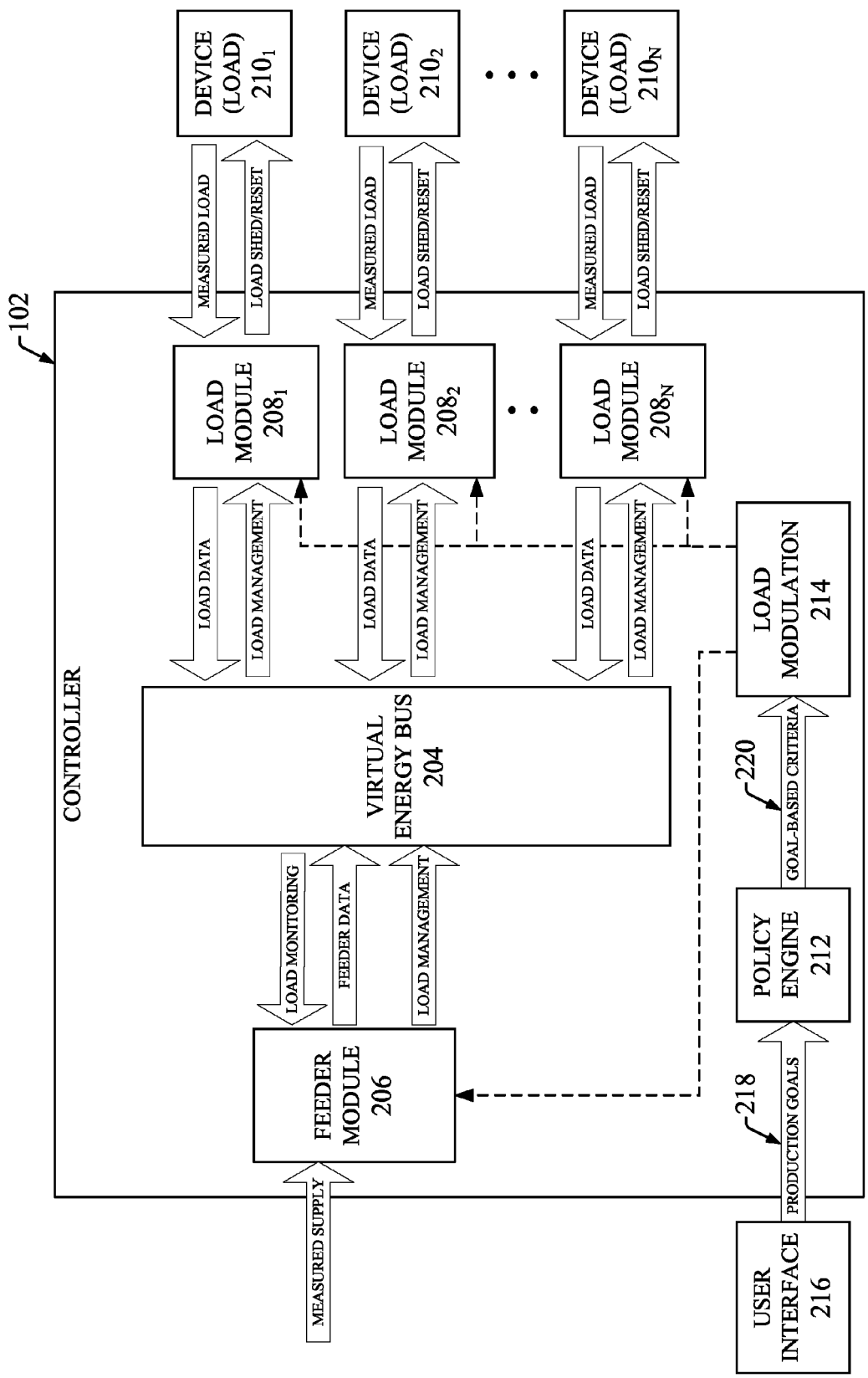
FIG. 2 depicts interactions between components of an exemplary modular load management architecture deployed within an industrial controller.

FIG. 2 depicts the interactions between components of an exemplary modular load management architecture deployed within industrial controller 102 and comprising the load management modules described above. In this exemplary system, devices $210_1$-$210_N$ represent energy consuming devices or machines operating within an industrial facility. These devices or machines can include, but are not limited to, pumps, motors, welders, presses, conveyors, mixers, casting furnaces, material handling or machining robots, or other such energy consuming machinery. Each load $210_1$-$210_N$ can comprise a single device or a group of devices having an aggregated energy demand. Devices $210_1$-$210_N$ need not be powered by the same form of energy. That is, loads $210_1$-$210_N$ can represent some heterogeneous combination of electrical loads, hydraulic loads, pneumatic loads, steam powered loads, gas powered loads, or other such load types. In cases wherein loads $210_1$-$210_N$ represent disparate energy types, the load data can be normalized prior to being processed by the modular load management system, e.g., using conversion modules 110 of FIG. 1.

The data collected by the controller for processing by a control program can include energy load data measured for the respective devices or load groups $210_1$-$210_N$. This can include, for example, measured electrical demand, measured steam power consumption, measured water energy usage, measured gas energy consumption (e.g., propane, natural gas, etc.), or other forms of energy depending on how the device is powered. The measured load data can be provided to the controller using any appropriate means, such as an analog signal from a load meter fed into an analog input module, a parameter read from a smart metering device across a network, or other such techniques. Typically, the data received at the controller will be scaled according to the engineering units (e.g., kW, MW, Btus, Joules, therms, Klbs, etc.) associated with the type of energy being measured.

Load modules $208_1$-$208_N$ can be instantiated in controller 102 and can be integrated with or interact with the control program being executed by the controller. Load modules $208_1$-$208_N$ act as interlocks to loads $210_1$-$210_N$, and comprise a number of inputs, outputs, and configurable attributes having predefined functionality. These inputs, outputs, and attributes can be used to share data generated by the load modules with other load management components, as well provide access to module data by control program 104 executing in controller 102. For example, each load module $208_1$-$208_N$ can receive its measured load data in a floating point Inp_LoadPV input register associated with the load module, and publish this measured load data, together with other values calculated by the load module, to other components in the load management architecture. Load modules $208_1$-$208_N$ can also include Boolean outputs that initiate shedding or resetting of corresponding loads in a coordinated fashion in order to keep peak demand below a maximum value, as explained in more detail below. Using data provided by other components within the load management architecture, load modules $208_1$-$208_N$ can also calculate and publish instantaneous load statistics for use by the control program or for visualization on a display. Moreover, to ensure that the architecture accurately represents the total system load even if metering is not available for some loads, load modules $208_1$-$208_N$ can be provided with a configurable load register that can receive a manually entered estimated value of a missing load, thereby allowing the architecture to factor in unmetered loads. Thus, load modules can represent both metered and unmetered loads so that the architecture has an accurate accounting of the overall load comprising an industrial system.

An exemplary set of input, outputs, and configuration parameters for the load module is listed in Table 1 below. This list is only intended to be illustrative, and the load modules contemplated herein are not limited to the example I/O listed here.

TABLE 1

Load Module I/O

| Name | Data Type | Usage | Description |
| --- | --- | --- | --- |
| REF_eBus | eBus | In/Out | Reference to Virtual Energy Bus (eBus) |
| Inf_DvcDscrpt | String | Local | Device description (e.g. for HMI display) |
| Inf_DvcID | String | Local | Device ID (Tag ID) |
| Cfg_EULoad | String | Local | Load engineering units |
| Inp_LoadPV | Real | Input | Input load when monitored (in engineering units) |
| Has_PVConv | Boolean | Input | Has conversion object |
| Cfg_Load | Real | Output | Configure load used when load is not monitored, or when in simulation (in engineering units) |
| Val_Load | Real | Output | Load (published to eBus) (in engineering units) |
| Cfg_EUSupply | String | Local | Supply engineering units |
| Cfg_Supply | Real | Input | Configured supply used when not provided by eBus (in engineering units) |
| Val_Supply | Real | Input | Supply available |
| Val_PctOfSupply | Real | Output | Load as a percentage of supply ((Load/Supply)*100) |
| Inp_LoadApl | Real | Input | Load applied |
| Cfg_ShedEnbl | Boolean | Input | Enable load shedding |
| Cfg_EShedEnbl | Boolean | Input | Enable emergency load shedding |
| Cfg_ShedPriority | Integer | Input | Configured load shed priority |
| Val_ShedPriority | Integer | Output | Shed priority for load |
| Inp_Shed | Boolean | Input | Input to force load shed |
| Out_Shed | Boolean | Output | Shed Load |
| Sts_Shed | Boolean | Output | Load was shed |
| Sts_EShed | Boolean | Output | Load was emergency shed |
| Sts_LoadNotShed | Boolean | Output | Load that was supposed to be shed did not shed |
| MCmd_Shed | Boolean | Local | Maintenance command to shed load |
| Rdy_Shed | Boolean | Local | Ready to accept maintenance command to shed load |

TABLE 1-continued

Load Module I/O

| Name | Data Type | Usage | Description |
|---|---|---|---|
| Val_PriorityThreshold | Integer | Output | When shedding loads - Shed all loads with a configured Shed Priority less than or equal to the Priority Threshold. When resetting loads - Reset all loads with a configured Reset Priority greater than or equal to the Priority Threshold |
| Inp_Reset | Boolean | Input | Input to force load shed reset |
| Cfg_ShedResetEnbl | Boolean | Input | 1 = Enable automatic reset after load is shed. 0 = Reset must be performed by logic or via HMI |
| Cfg_ResetPriority | Integer | Output | Reset priority for shed load |
| Cfg_MinResetTime | Real | Input | Minimum reset time (seconds); minimum period of time to wait prior to reset after load is shed |
| Sts_ResetRdy | Boolean | Output | Ready to reset shed load |
| Sts_LoadNotReset | Boolean | Output | Load that was supposed to be reset has not reset |
| MCmd_Reset | Boolean | Local | Maintenance command to reset shed load |
| Rdy_Reset | Boolean | Local | Ready to accept maintenance command to reset shed load |
| MCmd_Sim | Boolean | Input | Maintenance command to place load into simulation |
| Rdy_Sim | Boolean | Output | Ready to receive MCmd_Sim |
| Inp_Sim | Boolean | Input | Place load into simulation |
| Sts_Sim | Boolean | Output | Load in simulation |

The exemplary load management architecture can also include at least one feeder module 206 deployed in the controller. Like load modules $208_1$-$208_N$, feeder module 106 can comprise a number of predefined inputs, outputs, and configurable parameters that facilitate exchange of data with other components and with control program 104. Among other inputs, feeder module 206 can receive an energy supply value measured from a feeder that provides power to at least one of the loads $210_1$-$210_N$. This measured supply value can be published by the feeder module 206 to the virtual energy bus 204 and shared with load modules $208_1$-$208_N$, thereby providing the load modules with knowledge of the available supply at the feeder. Feeder module 206 also monitors all loads published to virtual energy bus 204 by load modules $208_1$-$208_N$ and makes load management decisions based on the monitored load data. This can include deciding when to initiate load shedding based on the total monitored load or based on a ratio of the total load to the total measured supply. Thus, the architecture allows energy supply and demand data to be exchanged via virtual energy bus 204, thereby providing a means to intelligently and autonomously manage energy load using integrated load management functionality.

An exemplary set of input, outputs, and configuration parameters for the feeder module is listed in Table 2 below. This list is only intended to be illustrative, and the feeder module contemplated herein is not necessarily limited to the example I/O listed here.

TABLE 2

Feeder Module Attributes

| Name | Data Type | Usage | Description |
|---|---|---|---|
| REF_eBus | eBus | In/Out | Reference to Virtual Energy Bus (eBus) |
| inf_DvcDscrpt | String | Local | Device description (e.g. for HMI display) |
| Inf_DvcID | String | Local | Device ID (Tag ID) |
| Cfg_EUSupply | String | Local | Supply engineering units |
| Cfg_Supply | Real | Input | Configure supply to feeder when feeder is not monitored (in supply engineering units) |
| Cfg_HasSupplyPV | Boolean | Input | Has measured supply |
| Inp_SupplyPV | Real | Input | Input supply to feeder when measured (in supply engineering units) |

TABLE 2-continued

Feeder Module Attributes

| Name | Data Type | Usage | Description |
| --- | --- | --- | --- |
| Val_Supply | Real | Output | Supply present at feeder |
| Cfg_EULoad | String | Local | Load engineering units |
| Cfg_Load | Real | Input | Configured load used when load is not monitored or when module is in simulation (in load engineering units) |
| Cfg_HasLoadPV | Boolean | Input | Has measured load |
| Inp_LoadPV | Real | Input | Load Input (in load engineering units) |
| Val_Load | Real | Output | Load present at feeder (Inp_LoadPV + eBus.Val_Load) |
| Sts_LoadExceedsSupply | Boolean | Input | Load on feeder exceeds available supply |
| Inp_SupplyEnbl | Boolean | Input | Supply enabled (applied) |
| Sts_SupplyEnbl | Boolean | Output | Supply enabled (applied) |
| Sts_SupplyNotEnbl | Boolean | Output | Supply not enabled (not applied) |
| Cfg_ShedEnbl | Boolean | Input | Enable load shedding |
| Cfg_EShedEnbl | Boolean | Input | Enable emergency load shedding |
| Inp_Shed | Boolean | Input | Activate load shed |
| Inp_EShed | Boolean | Input | Activate emergency load shed |
| Sts_Shed | Boolean | Output | Load shed active |
| Sts_EShed | Boolean | Output | Emergency Load Shed Active |
| Sts_LoadNotShed | Boolean | Output | One or more loads that have been instructed to shed have not shed |
| MCmd_Shed | Boolean | Local | Maintenance command to shed load |
| Rdy_Shed | Boolean | Local | Ready to accept maintenance command to shed load |
| Cfg_ShedResetEnbl | Boolean | Input | 1 = Enable automatic reset after load is shed<br>0 = Reset must be performed by logic or via the HMI |
| Inp_Reset | Boolean | Input | Reset shed load |
| Sts_ResetRdy | Boolean | Output | Ready to reset shed load(s) |
| Sts_LoadNotReset | Boolean | Output | One or more loads instructed to reset have not reset |
| MCmd_Reset | Boolean | Local | Maintenance command to reset shed load |
| Rdy_Reset | Boolean | Local | Ready to accept maintenance command to reset shed load |
| MCmd_Sim | Boolean | Input | Maintenance command to place Feeder module and all associated loads into simulation |
| Rdy_Sim | Boolean | Output | Ready to receive MCmd_Sim |
| Inp_Sim | Boolean | Input | Place Feeder module and all associated loads into simulation |
| Sts_Sim | Boolean | Output | Feeder module and all associated loads are in simulation |
| Val_LstGdLoad | Real | Output | Last good load (with circuit breaker closed) (in engineering units) |
| Val_PctOfSupply | Real | Output | Load as a percentage of supply (Load/Supply*100) |
| Val_PriorityThreshold | Integer | Output | When shedding loads - Shed all loads with a configured Shed Priority less than or equal to the Priority Threshold<br>When resetting loads - Reset all loads with a configured Reset Priority greater than or equal to the Priority Threshold |
| Val_LoadNextResetPriority | Real | Output | Total load which will be applied by decrementing to next Priority Threshold |
| Val_LoadNextShedPriority | Real | Output | Total load which may be shed by incrementing to next Priority Threshold |
| Sts_Reset CapacityOK | Boolean | Input | Supply capacity exists to reset shed loads assigned to the next Reset priority |

TABLE 2-continued

Feeder Module Attributes

| Name | Data Type | Usage | Description |
|---|---|---|---|
| Val_TotalNumberOfLoads | Integer | Outpupt | Total number of loads which belong to the feeder module |
| Val_NumberOfLoads | Integer | Output | Number of loads currently fed by the feeder module. |

As discussed above, virtual energy bus 204 (also known as the eBus) enables load modules $208_1$-$208_N$ and feeder module 206 to dynamically exchange energy supply (feeder) and demand (consumption) data. Virtual energy bus 204 can also employ the data published by the feeder and load modules to perform aggregated energy calculations that provide a highly granular picture of the facility's overall instantaneous energy utilization. For example, virtual energy bus can compute a total load seen by all load modules $208_1$-$208_N$ as a percentage of the available supply reported by the feeder module(s), a total energy load seen by each energy source associated with the bus, and other such calculations. In this way, virtual energy bus 204 can provide multiple orthogonal views of a facility's energy usage. Multiple energy busses can be instantiated and associated with selected subsets of load modules and feeder modules if segregated management of separate load systems is desired.

An exemplary set of input, outputs, and configuration parameters available for the virtual energy bus is listed in Table 3 below. This list is only intended to be illustrative, and the virtual energy bus contemplated herein is not necessarily limited to the I/O listed here.

TABLE 3

Virtual Energy Bus I/O

| Name | Data Type | Description |
|---|---|---|
| Cfg_EUSupply | String | Supply engineering units |
| PSet_Supply | Real | Add supply to eBus (in engineering units) |
| Val_Supply | Real | Supply available on eBus (from feeder module) (in engineering units) |
| Cfg_EULoad | Sting | Load engineering units |
| PSet_Load | Real | Add load to eBus (in engineering units) |
| PSet_LoadNextShedPriority | Real | Add load to next shed priority |
| PSet_LoadNextResetPriority | Real | Add load to next reset priority |
| Val_Load | Real | Load on eBus (in engineering units) |
| Val_PctOfSupply | Real | eBus load as a percentage of supply ((Load/Supply)*100) |
| Set_TotalNumberOfLoads | Integer | Increment total number of loads on eBus |
| Val_TotalNumberOfLoads | Integer | Total number of loads that belong to the eBus |
| Set_NumberOfLoads | Integer | Increment number of loads being fed by eBus |
| Val_NumberofLoads | Integer | Number of loads being fed by eBus |
| Val_PriorityThreshold | Integer | When shedding loads - shed all loads with a configured Shed Priority less than or equal to the Priority Threshold. When resetting loads - Reset all loads with a configured Reset Priority greater than or equal to the Priority Threshold |

TABLE 3-continued

Virtual Energy Bus I/O

| Name | Data Type | Description |
|---|---|---|
| Sts_Shed | Boolean | Load shedding active |
| Sts_EShed | Boolean | Emergency Load shedding active |
| Sts_LoadNotShed | Boolean | One or more loads that were instructed to shed have not shed |
| Sts_Reset | Boolean | Load shed reset active |
| Sts_LoadNotReset | Boolean | One or more loads that were instructed to reset have not reset |
| Cfg_CalcLoad | Boolean | Calculate load |
| Cfg_CalcSupply | Boolean | Calculate supply |
| Sts_ShedResetRdy | Boolean | Ready to reapply load |
| MCmd_Sim | Boolean | Maintenance command to place load in simulation |
| Sts_Sim | Boolean | Load in simulation |

In addition to being used by the controller to monitor and manage energy distribution, the data generated by the feeder module 206, load modules $208_1$-$208_N$, and virtual energy bus 204 can also be rendered on a user interface (not shown) for presentation to a user. The user interface can comprise any suitable user interface, such as a human-machine interface (HMI) that can read from and write to data registers within controller 102. The user interface can display the value of any input, output, or attribute associated with the load management components in order to present a highly granular view of a facility's current energy supply and usage status.

While the load management modules described above are illustrated in FIG. 2 as residing on a single controller, remote connectivity features inherent in the modules can allow for a distributed load management system deployed across multiple controllers. For example, load modules residing on a first controller can reference and exchange data with a virtual energy bus residing on a second controller, such that the load modules' data resident on the first controller is made available to the second controller, and thereby to a feeder module residing on the second controller. Load management decisions can then made by the feeder module or the virtual energy bus on the second controller taking into account the load module data received from the first module, and load management commands (e.g. load shed commands) generated by the modules on the second controller can be delivered to the load modules on the first controller. By deploying load management modules across multiple controllers and providing remote connectivity between the modules, a distributed load management system can be implemented. These aspects can allow modular load management to be implemented in an existing system wherein the various sets of energy sources and loads comprising the system are monitored by different controllers.

In order to facilitate goal-based load management using the modular components described above, policy engine 212 and load modulation component 214 can be deployed within controller 102. Policy engine 212 can receive information 218 specifying one or more production goals relevant to the operation of loads $210_1$-$210_N$. The production goal information 218 can be entered manually via a user interface 216 communicating with controller 102. User interface 216 can comprise a human-machine interface (HMI) or any other suitable interface having a configuration screen capable of receiving production goal selections or indications from a user. The production goals 218 can comprise one or more preferences, targets, or constraints relating to operation and/or energy utilization of devices $210_1$-$210_N$, such as a target production output (e.g., a target number of workpieces per shift or a total output that should be reach by the end of a specified time period), a selected workzone or subset of operations that should be given priority in the event of a load shed event, a desired maximum peak demand that should not be exceeded, or other such production and energy usage goals. It is to be appreciated that multiple production goals can be provided to policy engine 212, which can generate output criteria 220 in a standardized format for delivery to load modulation module 214.

For example, a user can specify a target output of a particular product that must be reached by a given date, and also that daily peak energy demand for all loads $210_1$-$210_N$ must remain below a specified maximum. Policy engine 212 can encode these goals as production criteria 220 in a standardized format and publish the criteria to load modulation component 214. Based on these criteria, load modulation component 214 calculates a load modulation strategy designed to achieve the production goals specified by the user. This can include determining when and how long devices $210_1$-$210_N$ should operate in order to achieve the target output within the specified timeframe without exceeding the desired maximum daily peak. Load modulation component 214 can also assign load shed and load re-application priorities to devices $210_1$-$210_N$ such that devices that are not required for fabrication of the selected product are shed before devices necessary for fabrication of the product in the event that loads must be shed to maintain the maximum peak demand, thereby making continued operation of a first subset of loads subservient to operation of a second subset of loads. Thus, based on the standardized goal-based criteria 220 generated by policy engine 212, load modulation component 214 can dynamically configure feeder module 206 and load modules $208_1$-$208_N$ to manage delivery of energy to loads $210_1$-$210_N$ in accordance with the production goals specified by an operator.

Although the load modulation component 214 is illustrated in FIG. 2 as interacting only with load modules resident within the same controller 102, a distributed load modulation system is also contemplated wherein load modulation component 214 can interact with feeder and load modules deployed across multiple controllers. For example, a first set of loads within an industrial system can be monitored by load modules resident on a first controller, while a second set of loads can be monitored by load modules on a second controller sharing a common network with the first controller. Load modulation component 214 can reside on the first or second controller, or on a separate third controller also on the common network, and can be configured to reference the load modules on both the first and second controllers. Based on the standardized criteria provided by policy engine 212, the load modulation component 214 can dynamically configure the load modules residing on both the first and second controllers, thereby providing dynamic load modulation for a distributed load management system.

Policy engine 212 can use any suitable model or algorithm to generate the criteria used by load modulation component 214. In one or more exemplary embodiments, policy engine 212 can employ a distributed goal achievement model whereby specified load management or production goals are associated with figures of merit, and an algorithm is used to compute an optimal set of goals that can be satisfied given the current state of the system. This information can then be provided to the load modulation component 214, which can configure feeder module 206 and/or load modules $208_1$-$208_N$ to move the system into the best available state given current system conditions and the weighted goals.

As an example of this policy engine model, assume a set of N machines, $M=\{m_i\}$, where i=1-N. The machines can represent loads $210_1$-$210_N$. Each machine can either be on ("true") or off ("false"). A system goal, G, can be expressed as a Boolean expression comprising a conjunction of disjunctive clauses in which each term of each clause refers to exactly one machine. For example, in a system of four machines, one such goal could be represented as:

$$G_1 = (m_1 \vee m_2) \wedge (m_3 \vee m_4)$$

In this example there are two disjunctive clauses ($m_1 \vee m_2$) and ($m_3 \vee m_4$). The first clause states that either machine 1 or machine 2 should be on, and the second states that machine 3 should be on or machine 4 should be off. The overall goal $G_1$ states that both clauses should be true. Each clause can be considered a sub-goal, and a measure of merit can be assigned to each clause. For instance, if the first clause, ($m_1 \vee m_2$), is assigned a merit value of 10, and the second clause, ($m_3 \vee m_4$), is assigned a merit of 7, then the overall possible achievable values of merit for the system are 0, 7, 10, and 17, depending on which clauses are true, as shown in Table 4 below. Given such a goal statement and the figures of merit, the load management system can then prioritize its load control actions and choose the actions that will maximize the overall system merit.

TABLE 4

Overall Possible Figure of Merit for Goal $G_1$

| ($m_1 \vee m_2$) | ($m_3 \vee \neg m_4$) | Merit |
|---|---|---|
| True | True | 17 |
| True |  | 10 |
|  | True | 7 |
|  |  | 0 |

These optimization actions can continue to occur even when some machines fail. To continue with the above example, assume that the load modulation component 214 initially decides to turn machine 1 on to satisfy the first clause (in accordance with the policy criteria provided by policy engine 212). If machine 1 were to fail or to otherwise become inoperable, the load modulation component 214 can then decide to turn machine 2 on. If new production goal information is provided to the policy engine 212 resulting in a new goal expression (e.g., $G_2 = (m_1 \vee m_3 \vee m_4) \wedge (m_2)$) with new associated merit values, the policy engine 212 and load modulation component 214 can automatically move the system into a new state that maximizes the new overall figure of merit.

Given a set of N machines, each either on or off, there are $2^N$ possible system states. For each system state, a figure of merit can be calculated based on the number of sub-goals (clauses) that are true. These states can then be arranged from high merit values to lower merit values, and the load management system can always try to achieve a state with the highest overall figure of merit given the current system conditions. To continue with the present four-machine example and goal $G_1$, the 16 possible system states and their resultant figures of merit are shown in Table 5 below

TABLE 5

Complete State Space for Goal $G_1$

| $m_1$ | $m_2$ | $m_3$ | $m_4$ | $(m_1 \vee m_2)$ | $(m_3 \vee m_4)$ | Merit |
|---|---|---|---|---|---|---|
| True | True | True | True | True | True | 17 |
| True | True | True |  | True | True | 17 |
| True | True |  | True | True |  | 10 |
| True | True |  |  | True | True | 17 |
| True |  | True | True | True | True | 17 |
| True |  | True |  | True | True | 17 |
| True |  |  | True | True |  | 10 |
| True |  |  |  | True | True | 17 |
|  | True | True | True | True | True | 17 |
|  | True | True |  | True | True | 17 |
|  | True |  | True | True |  | 10 |
|  | True |  |  | True | True | 17 |
|  |  | True | True |  | True | 7 |
|  |  | True |  |  | True | 7 |
|  |  |  | True |  |  | 0 |
|  |  |  |  |  | True | 7 |

Nine of the 16 possible states in this example result in the maximum figure of merit. If the 16 states are reordered by merit, with a secondary sort based on minimum number of machines that are on (e.g., to minimize energy consumption), the result is as show in Table 6.

TABLE 6

Ordered State Space for Goal $G_1$

| $m_1$ | $m_2$ | $m_3$ | $m_4$ | $(m_1 \vee m_2)$ | $(m_3 \vee m_4)$ | Merit |
|---|---|---|---|---|---|---|
| True |  |  |  | True | True | 17 |
|  | True |  |  | True | True | 17 |
| True |  | True |  | True | True | 17 |
| True | True |  |  | True | True | 17 |
|  | True | True |  | True | True | 17 |
| True | True | True |  | True | True | 17 |
| True |  | True | True | True | True | 17 |
|  | True | True | True | True | True | 17 |
| True | True | True | True | True | True | 17 |
| True |  |  | True | True |  | 10 |
|  | True |  | True | True |  | 10 |
| True | True |  | True | True |  | 10 |
|  |  |  |  |  | True | 7 |
|  |  | True |  |  | True | 7 |
|  |  | True | True |  | True | 7 |
|  |  |  | True |  |  | 0 |

The load modulation component 214 thus configures and/or prioritizes load modules $208_1$-$208_N$ to achieve the first state in the table. If the first state is not viable (e.g., because of machine availability), load modulation component 214 will try to achieve the second state, etc.

It is to be appreciated that the distributed goal achievement calculation method described above is only intended to be an exemplary technique by which policy engine 212 and load modulation component 214 can perform load management decision-making to achieve or optimize a set of specified production or energy usage goals. However, the subject goal-based load management system is not limited to this method for calculating load management priorities, and any suitable calculation strategy can be employed by policy engine 212 and load modulation component 214 to implement goal-based load management.

Figure 3:
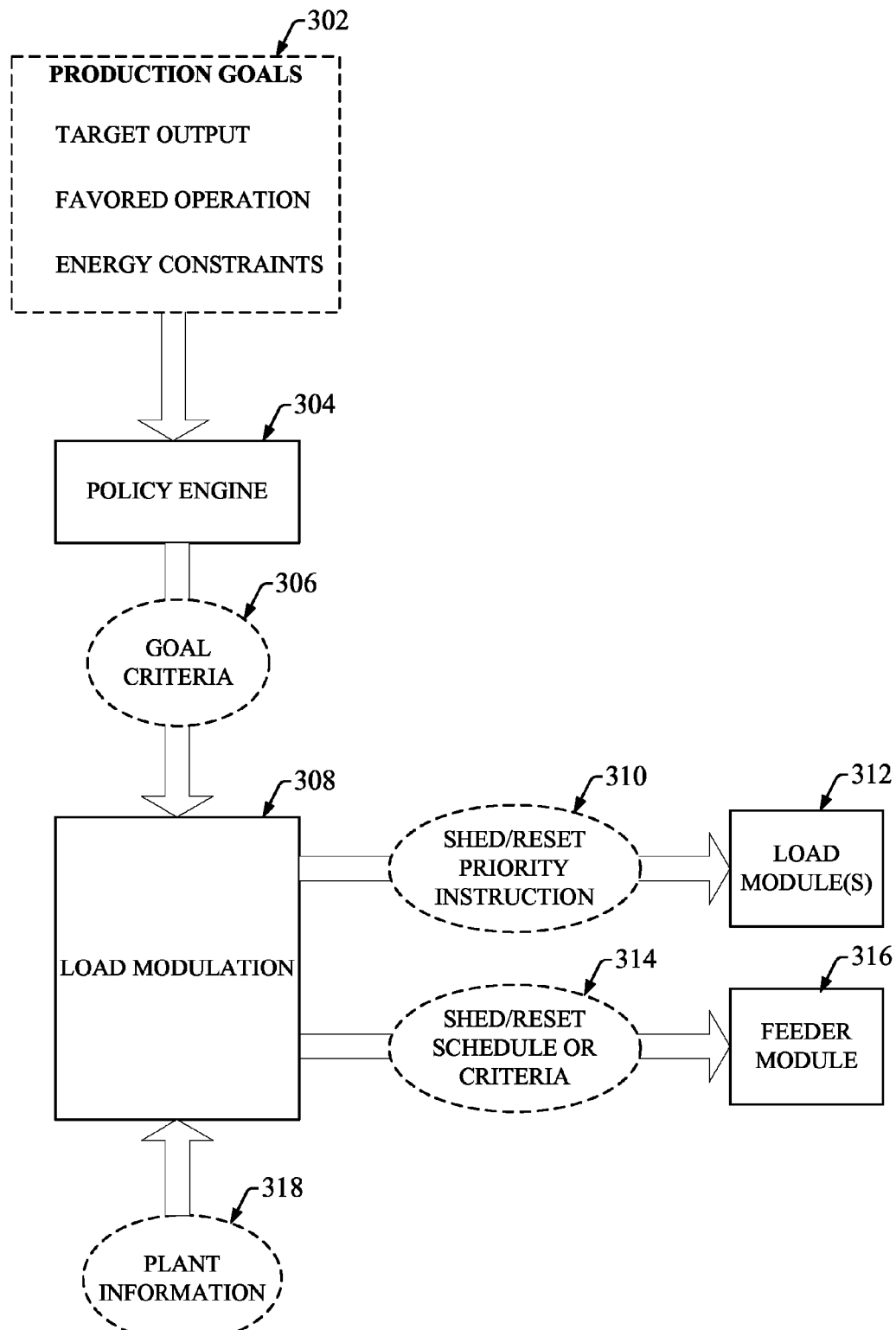
FIG. 3 depicts interactions between load management and goal-based production components.

FIG. 3 illustrates the interactions between the load management and goal-based production components in more detail. As noted above, policy engine 304 receives information specifying one or more production goals 302. These goals can be entered via a user interface such as an HMI, a custom data entry application, or other such data entry means. The production goals 302 can include, for example, a target production output. This target value can be specified in terms of a total product count to be produced per work shift, a total count to be produced by a particular date or time, or other suitable measure of output. Production goals 302 can also include an indication of a selected operation or product to be given preference in the event that load shedding is necessary. By selecting a favored operation or product, delivery of energy to load devices unrelated to the favored operation or product can be made subservient to the continued operation of machines related to the favored operation or product. In addition to goals relating to product output, product goals 302 can include constraints on energy utilization, such as specification of a desired maximum energy demand for all loads, a limit on the total daily power consumed by a subset of load devices, or other such energy usage constraints. Advantageously, multiple production goals can be submitted to policy engine 304, and the system can implement a load modulation strategy designed to concurrently achieve the multiple goals or to optimize load distribution using the multiple goals as constraints.

Using production goals 302, policy engine 304 can generate standardized goal criteria 306 for publication to load modulation component 308. Load modulation component 308 can analyze these goal criteria 306 in view of plant-specific information 318 about the operation of the load devices (explained in more detail below) to calculate a load modulation strategy designed to achieve or optimize the specified goals. Load modulation component 308 can implement the calculated load modulation strategy by configuring load module(s) 312 and/or feeder module 316 to carry out the load modulation strategy. For example, load modulation component 308 can calculate load shed and load reset priorities for each load module 312 based on the goal criteria 306, and deliver these calculated priorities to the load modules using one or more priority configuration instructions 310. The load shed priorities define relative priorities for each load that determine an order in which the loads are to be shed in the event of a load shed operation. Load modulation component 308 can also generate a load shed and/or load reset schedule or criteria 314 that accord to the specified production goals, and deliver this schedule/criteria to feeder module 316, which controls when load shedding and resetting takes place.

As noted above, load modulation component 308 can be configured with plant-specific information 318 to facilitate customizing a load management strategy in view of one or more specified production goals. This plant-specific information can include information defining the functionality of the various devices associated with load module(s) 312, products manufactured by each device, an average daily power consumption for each device, an average daily peak demand for each device, plant shift schedules, and other such information relevant to load prioritization. Load modulation component 308 can cross-reference this plant information 318 with the goal criteria 306 to determine which loads should be given higher shed priorities over other loads. For example, if the goal criteria indicates that a particular product should be given priority over another product, load modulation component 308 can reference plant information 318 to determine which loads (and associated load module(s) 312) are crucial to the manufacture of the high-priority product. Load modulation component 308 can then use this information to prioritize load module(s) 312 accordingly. In another example, plant info 318 can include shift schedule information for the plant, and load modulation component 308 can use this information to determine which shifts should run a particular load in order to achieve a specified output goal without exceeding a daily energy usage restriction.

Figure 4:
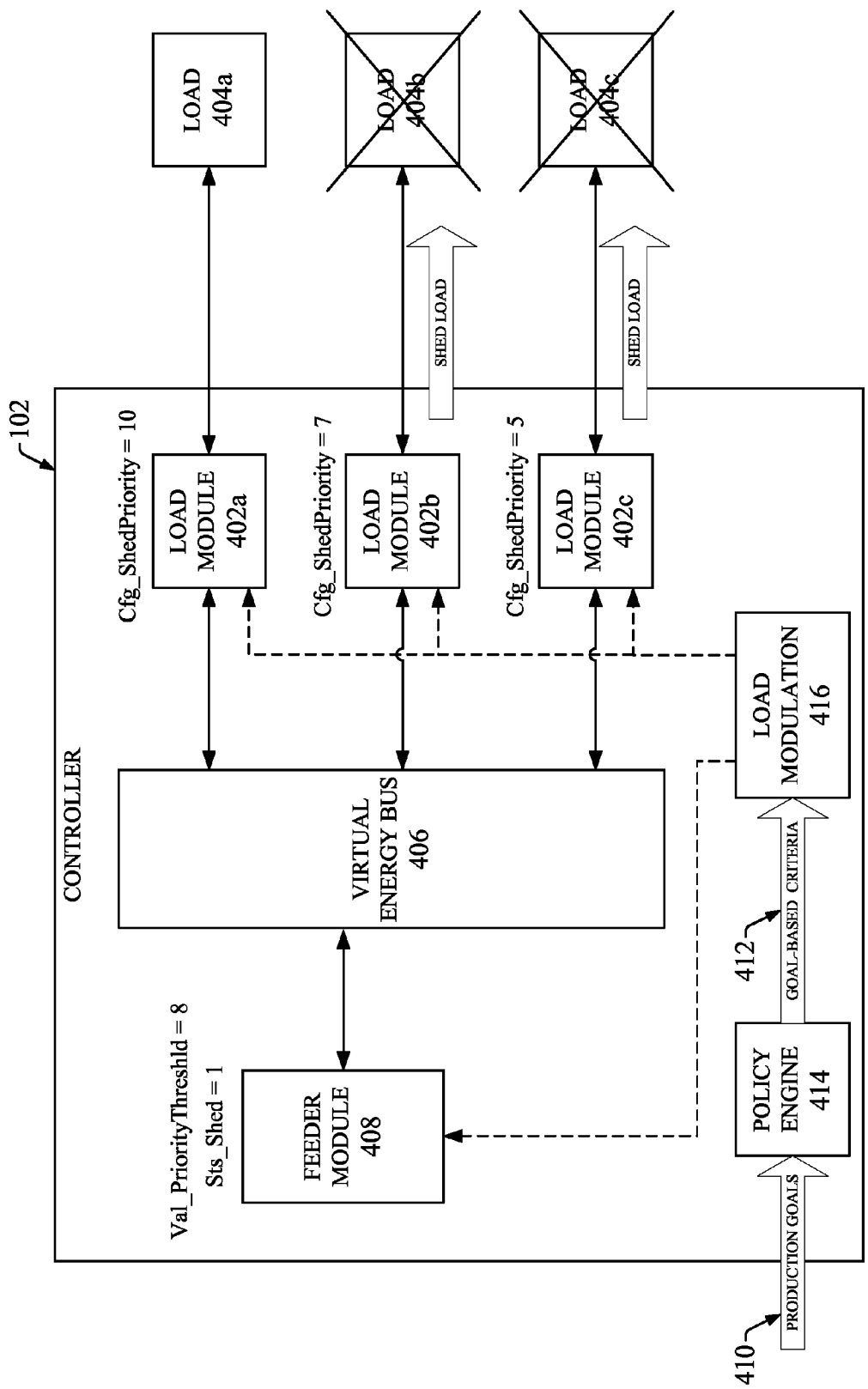
FIG. 4 depicts an exemplary goal-based load shedding scenario in accordance with the present invention.

FIG. 4 depicts an exemplary goal-based load shedding scenario in accordance with the concepts discussed above. In this exemplary scenario, production goal information 410 entered by a user can define that a specified quantity of a selected product should be produced before the end of the current shift while keeping peak energy demand below a specified maximum. Policy engine 414 can receive this production goal information 410 and generate criteria output 412 in a standardized format for delivery to load modulation component 416. Based on the goal criteria 412 generated by policy engine 414, load modulation component 416 can assign relative priorities to load modules 402a-402c such that load devices necessary for fabrication of the selected product (e.g., load 404a corresponding to load module 402a) have a higher load shed priority than load devices that perform functions unrelated to manufacture of the specified product (e.g., loads 404b and 404c, corresponding to load modules 402b and 402c, respectively). This can comprise, for example, dynamically setting values for the Cfg_ShedPriority configuration inputs for the respective load modules 402a-402c (see Table 1). In the present example, load module 402a, which interlocks with a load 404a that is critical to manufacture of the selected product, has been assigned a relatively high shed priority of 10, while load modules 402b and 402c, which interlock to loads that are not related to manufacture of the specified product (404b and 404c), have been assigned lower shed priorities of 7 and 5, respectively.

Load modulation component 416 can also deliver information regarding the desired maximum peak demand to feeder module 408. This information can take the form of a peak demand setpoint, a load usage schedule, or any other suitable instruction that can be used by feeder module 408 to determine when to initiate load shedding in order to maintain the desired peak. To coordinate prioritized load shedding, feeder module 408 can include an integer priority threshold value (e.g., Val_PriorityThreshold of Table 2). This value can be preset for feeder module 408 or can be set by load modulation component 416 in order to achieve specified production or energy utilization goals. The value of the feeder module's priority threshold during load shedding determines which loads will be shed at a given time. When load shedding is active, only those loads whose configured shed priority value is less than or equal to the priority threshold value will be shed.

During subsequent operation, load modules 402a-402c receive metered load consumption data from loads 404a-404c (via suitable metering signals delivered to I/O associated with controller 102) and publish the metered load data to virtual energy bus 406 to be collectively monitored by feeder module 408. If, based on the monitoring, feeder module 408 determines that load shedding is necessary to avoid exceeding the specified maximum peak demand (e.g., if the total load data published by load modules 402a-402c is within a predetermined range of the maximum peak demand specified by the production goals), feeder module 408 can initiate load shedding (causing Sts_Shed status output of feeder module 408 to be set to 1). When load shedding is active, all load modules having configured Shed Priorities less than the priority threshold value set for feeder module 408 will instruct their associated loads to disable operation, disconnect from the energy feeder, enter a low-energy state, or perform any suitable operation that substantially reduces the load consumed by those devices. In the present example, load modules 402b and 402c, which were configured by load modulation component 416 to have shed priorities less than the priority threshold, instruct their associated load devices 404b and 404c to shed their loads. Since load module component 416 configured the shed priority of load module 402a to be higher than the priority threshold, corresponding load 404a is allowed to continue normal operation pursuant to the specified production goals. By dynamically prioritizing load modules 402a-402c, load modulation component 416 can ensure that the target output for the selected product is achieved while at the same time maintaining a peak demand that is below the desired maximum peak specified by the goals.

During load shedding, the priority threshold value of feeder module 408 can be increased incrementally as needed to ensure that a sufficient number of loads have been shed without disabling an excessive number of loads. For example, the priority threshold can be set to a low value prior to initiating load shedding. This ensures that only relatively low priority devices are disabled initially during a load shedding operation. The initial Shed Priority value can be set as a default for feeder module 408, or alternatively can be set by the control program executing in controller 102. Because of the goal-based prioritization of load modules 402a-402c, load devices that are not used to manufacture the product specified by the production goal data will be shed before load devices required to manufacture the specified product. If feeder module 408 determines that additional loads must be shed to maintain the specified maximum peak demand (e.g. if the energy being drawn by the remaining loads continues to risk exceeding the specified maximum peak), the priority threshold can be incremented, thereby causing additional higher priority load modules to disable their respective loads. This adjustment of the priority threshold can be performed by feeder module 408 itself if the feeder module determines that the energy draw reported by virtual energy bus 406 remains above an acceptable threshold for a predetermined amount of time after load shedding was initiated or since the previous priority threshold adjustment.

If the defined production goals 410 indicate that the goal of reaching the target output of the product manufactured by load device 404a is to be subservient to the goal of maintaining a peak energy demand below the defined maximum, shedding of load 404a can be enabled but given a high priority to ensure that it is among the last loads shed as the priority threshold increases, thereby improving the chances of reaching the target output goal. Alternatively, if the production goals 410 specify that the goal of energy conservation is to be subservient to the goal of reaching the target output count, load modulation component 416 can disable load shedding of 404a altogether (e.g. by resetting Cfg_ShedEnbl of Table 1 to zero) to ensure that production of the selected product continues even if the desired peak demand is exceeded. Alternatively, the priority threshold can be adjusted by the custom control program executing in controller 102 by writing an appropriate value to the feeder module 408.

In addition to prioritizing load shedding, load modulation component 416 can also configure appropriate priorities for load resetting based on the criteria 412 generated by policy engine 414. These configured load reset priorities control the order in which loads that have been shed are brought back online. For example, load modulation component 416 can configure a higher load reset priority (e.g., Cfg_ResetPriority of Table 1) for load module 402a than for load modules 402b and 402c. When feeder module 408 determines that load shedding is no longer necessary, it can initiate load resetting. When load resetting is in progress, the previously shed loads can be reset according to the reset priority values configured for the associated load modules (e.g., Cfg_ResetPriority of Table 1). As with load shedding, the resetting of loads can be performed based on a comparison of the respective reset priority values for the load modules with the priority threshold value of feeder module 408. When load resetting is initiated by feeder module 408, loads whose corresponding load modules have reset priority values greater than or equal to the priority threshold will be reset. The priority threshold can then be decreased in increments according to a preconfigured routine in order to reset the loads having lower reset priorities. The decision to initiate load resetting or to decrease the priority threshold during a load reset sequence can be based in part on the current load or load-to-supply ratio, together with an estimated value of the total load expected to be applied when the priority threshold is decremented to the next value (as calculated by the feeder module and reported as an output, e.g. Val_LoadNextResetPriority of Table 2). Feeder module 408 can estimate this expected additional load based on knowledge of which load modules will be reset when the priority threshold is decremented as well as how much demand those loads are expected to draw (based, for example, on a last known demand prior to shedding). If feeder module 408 determines that the current total load seen by virtual energy bus 406 plus the estimated load that will be added by decrementing the priority threshold does not exceed the desired maximum peak demand, the priority threshold will be decremented and the appropriate loads reset by the load modules. If feeder module 408 is configured such that load resetting is disabled, feeder module 408 will not reset the loads after load shedding is complete, but instead will allow loads that had been shed to be reset with custom control programming or via manual reset.

Although the goal-based prioritization features of the present disclosure were described above in connection with an exemplary modular load management system comprising feeder module 408, load modules 402a-402c, and virtual energy bus 406, it is to be appreciated that the functionality of policy engine 414 and load modulation component 416 are not limited to operation within such a load management system. For example, in one or more embodiments, load modulation component 416 can directly control load shedding and resetting of loads 404a-404c via controller 102 in accordance with the criteria 412 provided by policy engine 414, rather than configuring load modules 402a-402c and feeder module 408 to perform the load management functions.

As can be seen in the above example, policy engine 414 and load modulation component 416 can allow energy load modulation for one or more systems in a facility to be dynamically calculated or updated based on new production goals. This represents an improvement over traditional load management systems, which often employ fixed load shedding and resetting priorities that do not allow for varying production goals. Moreover, the goal-based load management architecture described herein can be integrated as part of a general controls architecture, such as within a programmable automation controller (PAC), thereby allowing goal-based energy load management to be added to an existing control solution and facilitating coordination between load management considerations and control of plant operations in general. In addition, by deploying the goal-based load management architecture within a control program executed within a controller, the architecture can leverage the controller's hardwired and networked I/O to manage energy usage in an integrated and coordinated fashion without the need for separate load management instrumentation.

Figure 5:
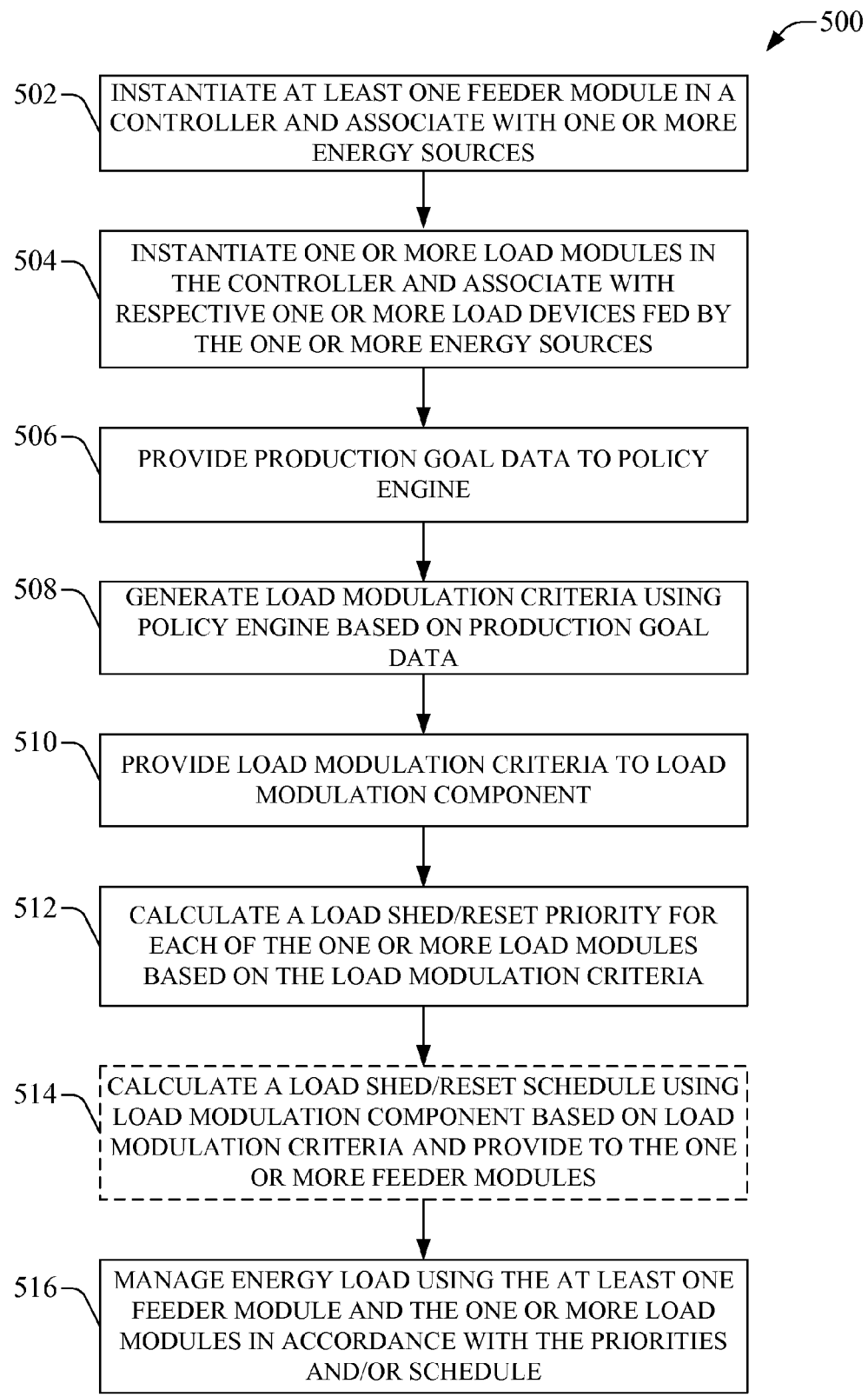
FIG. 5 is a flowchart of an example methodology for dynamically scheduling and prioritizing load shedding and load resetting for a plurality of load devices in an energy distribution system based on specified production goals.
Figure 6:
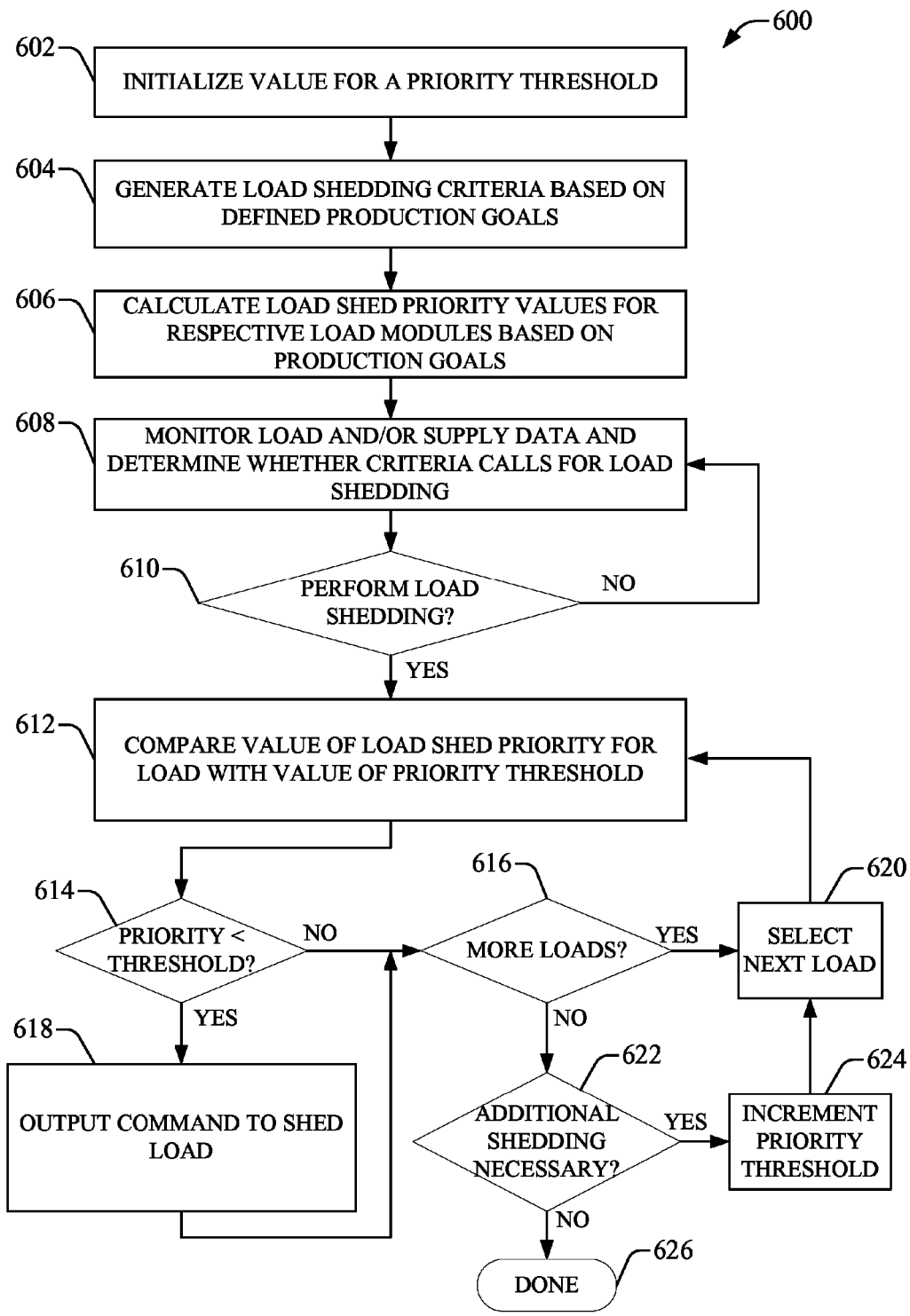
FIG. 6 is a flowchart of an exemplary methodology for configuring and carrying out automated prioritized load shedding in accordance with one or more defined production goals.

FIGS. 5-6 illustrate various methodologies in accordance with the claimed subject matter. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 5 illustrates an example methodology 500 for dynamically scheduling and prioritizing load shedding and load resetting for a plurality of load devices in an energy distribution system based on production goals provided by a user. At 502, one or more feeder modules are instantiated in a controller and associated with one or more energy sources that provide supply energy to drive one or more devices or machines within an industrial facility. The feeder module can comprise a deployable software module that can be integrated within a new or existing control program designed to control one or more operations in the industrial facility. The feeder module can interface with the control program through predefined functional inputs and outputs associated with the module, and can be associated with energy sources of virtually any type, including electrical, gas, water, steam, air, or other such forms of energy.

At 504, one or more load modules are instantiated in the controller and associated with respective one or more loads fed by the one or more energy sources. Like the feeder module, the load modules can be deployable software modules that integrate with the control program, as well as the load module, using associated functional inputs and outputs. Each load associated with a load module can represent an individual device or machine, or a plurality of devices or machines that are collectively metered as a single load.

At 506, production goal data is provided to a policy engine. The policy engine can be deployed within the controller, or alternatively can reside in a separate server or other computing device that communicatively interacts with the controller. Production goal data can be provided to the policy engine through any suitable user interface, such as an HMI, a custom graphical user interface (GUI), or other such data entering means. Production goals defined by the data can include such criteria as a desired output of a product within a specified timeframe, a defined maximum daily peak energy demand for all loads on the system, a product to be given manufacturing priority over other products, whether energy usage is to be subservient to product output or vice versa, or other suitable production goals that affect how energy is best utilized and managed in the system. It is to be appreciated that multiple production goals can be defined and provided to the policy engine, which can determine criteria for load management that achieves or optimizes the multiple production goals.

At 508, the policy engine analyzes the production goal data and generates corresponding load modulation criteria. The policy engine generates these criteria in a standardized format that can be used to schedule and/or prioritize load management functions within the energy distribution system. The load modulation criteria can define load management constraints or priorities that can be applied to the energy distribution system to facilitate achievement of the defined production goals. At 510, these standardized criteria can be provided to a load modulation component. Like the policy engine, the load modulation component can be deployed within the controller to facilitate integrated load management using an existing general control architecture. Alternatively, the load modulation component can reside on a separate server or other computing device capable of exchanging data with the controller.

At 512, the load modulation component calculates a load shed priority and/or a load reset priority for each of the load modules based on the criteria provided by the policy engine. The load shed priorities define an order in which the respective load devices will be shed in the event that load shedding is deemed necessary. These priorities can be assigned in accordance with a load management strategy calculated by the load modulation component to achieve the defined production goals. For example, if the production goals indicate that a selected product is to be given priority over other products, loads critical to manufacture of that product will be given a higher shed priority by the load modulation component, thereby ensuring that those loads are among the last to be shed in the event that load reduction is necessary. Likewise, load modulation component can assign higher reset priorities to load modules whose associated loads are critical to manufacture of the selected product, which ensures that those devices will be among the first to be brought back on-line when load shedding is no longer necessary. These load shed and/or load reset priorities can be set for the load modules by the load modulation component.

Additionally, the load modulation component can configure the feeder module to initiate load shedding in accordance with the production goals. This can comprise providing information regarding a desired maximum daily peak demand for all loads on the energy distribution system so that the feeder module can initiate load shedding and load resetting at appropriate times to avoid exceeding the desired maximum demand. Thus, the load modulation component can configure the feeder module to initiate shedding and resetting of loads as needed to maintain a desired maximum peak energy demand, and can also configure shift/reset priorities for the load modules to ensure that product output goals are not undermined by energy conservation imperatives.

At 514, the load modulation component can optionally calculate a production schedule based on the production goal criteria provided by the policy engine. This schedule can determine optimal running times for the loads on the system in order to achieve the specified production goals. For example, if the production goals define that a target output of a product is to be reached before a given date while keeping daily peak energy demand below a specified maximum, the load modulation component can determine whether these goals can be achieved by running only two shifts per day, or alternatively if a third shift must be run in order to achieve both the product output and energy usage goals. The schedule can be determined based, for example, on estimated daily energy usage of each load during normal operation. This estimated daily energy usage can be determined based on historical energy usage for each load, energy usage data provided by a user, or other such methods. The load modulation component can also consider an average product output per shift when determining a suitable operating schedule for achieving the defined production goals. By correlating product output with energy usage, and considering these correlations in connection with specified production goals, the load modulation component can easily generate goal-based operation schedules designed to achieve multiple product output and/or energy utilization goals without the need for complicated custom code.

At 516, energy load is managed using the feeder module and the one or more load modules as configured by the load modulation component. This load management can comprise initiation of load shedding as needed to prevent total demand from exceeding a defined maximum peak, shedding load devices in a prioritized order to ensure that a target output of a selected product is reached, and other such load management functions designed to achieve the one or more production goals set forth by the user. As noted above, load management instructions can be initiated by the feeder and/or load modules, which can leverage the controller's native I/O to transmit appropriate control signaling to the load devices or their associated breakers, switches, etc. to carry out the load management decisions.

FIG. 6 depicts an exemplary methodology 600 for configuring and carrying out automated prioritized load shedding in accordance with one or more defined production goals. At 602, a value is initialized for a priority threshold. This priority threshold will be used to determine which loads on an energy distribution system are to be shed when peak shaving is necessary. In an exemplary modular load management architecture, the priority threshold can be associated with a feeder module. This feeder module can be a software module instantiated in the controller and having a number of predefined inputs, outputs, and configurable attributes. The feeder module is associated with an energy supply feeder that provides power to a number of load devices in an industrial facility and receives energy supply metering data for the feeder.

At 604, load shedding criteria are generated based on one or more specified production goals. As described above, these production goals can be defined by a user and can include such criteria as target product output, products to be given manufacturing priority, desired maximum energy utilization, whether production output is to be subservient to energy conservation or vice versa, or other such goals. The load shedding criteria are used to identify conditions under which load shedding is to be initiated in order to achieve one or more of the production goals. This can include specifying a total instantaneous demand for all loads on the system at which load shedding should be initiated in order to avoid exceeding a desired maximum peak demand for the current shift or workday.

At 606, load shed priority values are calculated for respective loads on the system based on the one or more production goals. The load shed priorities are calculated such to achieve or optimize the specified production goals. These load shed priority values can, for example, be assigned to respective load modules associated with the system loads Like the feeder module, the load modules are configurable software modules having associated preconfigured inputs, outputs, and configurable parameters. Each load module acts as an interlock, via the native I/O of the controller, to a load device or a group of load devices fed by the supply feeder. Both the feeder module and the load modules can be integrated with and interact with a control program executing on the controller to effect control of one or more industrial processes.

At 608, energy load and/or supply data is monitored and processed, and a determination is made regarding whether load shedding should be initiated pursuant to the goal-based criteria. In the exemplary modular load management architecture, the load data can be received by the load modules, which can broadcast the load data to the feeder module through a common reference to a virtual energy bus. The feeder module can then collectively monitor the loads in view of the goal-based criteria to determine if load shedding is necessary at 610. If load shedding is not deemed necessary, flow returns to step 608, and the monitoring of load and/or supply data continues. Alternatively, if it is determined that load shedding is necessary, the load shedding sequence can begin at 612, wherein the load shed priority for a load is compared with the initialized priority threshold value.

At 614, a determination is made whether the load shed priority value for the load is less than the priority threshold. If the load shed priority for the load is not less than the threshold, flow moves to step 616, where it is determined whether there are additional loads to be checked. Alternatively, if the load shed priority is less than the priority threshold, a command is generated at 618 instructing the load or group of loads to enter a no-load or low-load state. In the exemplary modular load management architecture, this command can be generated by the load module associated with the load. Issuing the command can comprise instructing the load(s) to switch to an off state or to low-power operation, or sending a control signal to open a breaker that disconnects the load from the feeder entirely. Flow then moves to 616, where it is determined whether there are additional loads to be checked. If there are additional loads (e.g., additional load modules having respectively assigned shed priorities), the process moves to the next load at 620, then repeats the threshold comparison and load shedding sequence of steps 612-618 for the next load. Alternatively, if it is determined that all loads have been compared with the priority threshold at 616, flow moves to 622, wherein it is determined whether additional load shedding is necessary. This determination can be made, for example, by the feeder module after all loads having load shed priorities less than the priority threshold have been shed. The feeder module can base the decision, for example, on whether the new total demand after load shedding (or the new load-to-supply ratio) still exceeds a desired threshold. If no additional shedding is necessary, the flow ends at 626. Alternatively, if it is determined that additional shedding is required, the threshold priority is incremented at 624. The priority threshold can be incremented by the feeder module itself, or by the control program executing on the controller. The threshold comparison and load shedding sequence of steps 612-620 is then repeated using the new priority threshold.

It is to be appreciated that one or more loads can be configured to be immune to load shedding if necessitated by the defined production goals. For example, if the production goals specify that target output for a selected product manufactured by a particular machine is to be reached within a specified timeframe, and that energy conservation considerations are to be subservient to this production goal, the load shed priority calculated at step 606 for the load module associated with this machine can be set to disable shedding of this machine's load under any circumstances, thereby ensuring compliance with the user's specified goals. Thereafter, the load module associated with the critical machine will be exempt from selection by steps 616 and 620 of the above sequence.

Embodiments, systems and components described herein, as well as industrial control systems and industrial automation environments in which various aspects set forth in the subject specification can be carried out, can include computer or network components such as servers, clients, programmable logic controllers (PLCs), communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC as used herein can include functionality that can be shared across multiple components, systems, and/or networks. As an example, one or more PLCs can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet and ControlNet. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

Figure 7:
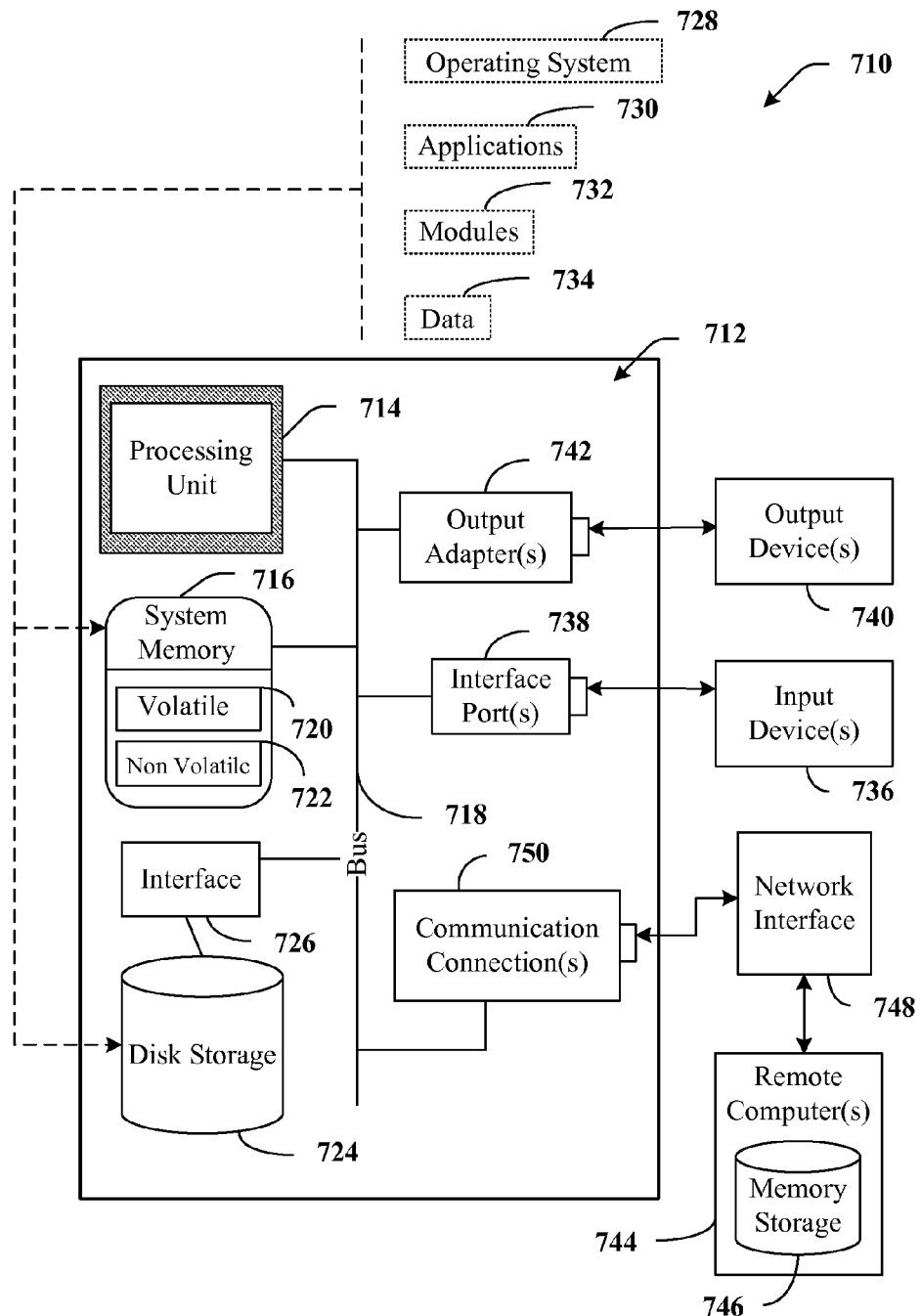
FIG. 7 is an example computing environment.

With reference to FIG. 7, an example environment 710 for implementing various aspects of the aforementioned subject matter, including retaining documentation natively within memory of an industrial controller, includes a computer 712. The computer 712 includes a processing unit 714, a system memory 716, and a system bus 718. The system bus 718 couples system components including, but not limited to, the system memory 716 to the processing unit 714. The processing unit 714 can be any of various available processors. Dual microprocessors and other multiprocessor architectures also can be employed as the processing unit 714.

The system bus 718 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 716 includes volatile memory 1120 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable PROM (EEPROM), or flash memory. Volatile memory 720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 712 also includes removable/non-removable, volatile/nonvolatile computer storage media. FIG. 7 illustrates, for example a disk storage 724. Disk storage 724 includes, but is not limited to, devices like a magnetic disk drive, floppy disk drive, tape drive, Jaz drive, Zip drive, LS-100 drive, flash memory card, or memory stick. In addition, disk storage 724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used such as interface 726.

It is to be appreciated that FIG. 7 describes software that acts as an intermediary between users and the basic computer resources described in suitable operating environment 710. Such software includes an operating system 728. Operating system 728, which can be stored on disk storage 724, acts to control and allocate resources of the computer system 712. System applications 730 take advantage of the management of resources by operating system 728 through program modules 732 and program data 734 stored either in system memory 716 or on disk storage 724. It is to be appreciated that the subject invention can be implemented with various operating systems or combinations of operating systems.

A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port may be used to provide input to computer 712, and to output information from computer 712 to an output device 740. Output adapter 742 is provided to illustrate that there are some output devices 740 like monitors, speakers, and printers, among other output devices 740, which require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a personal computer, a server, a router, a network PC, a workstation, a microprocessor based appliance, a peer device or other common network node and the like, and typically includes many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to computer 712. The hardware/software necessary for connection to the network interface 748 includes, for exemplary purposes only, internal and external technologies such as, modems including regular telephone grade modems, cable modems and DSL modems, ISDN adapters, and Ethernet cards.

Figure 8:
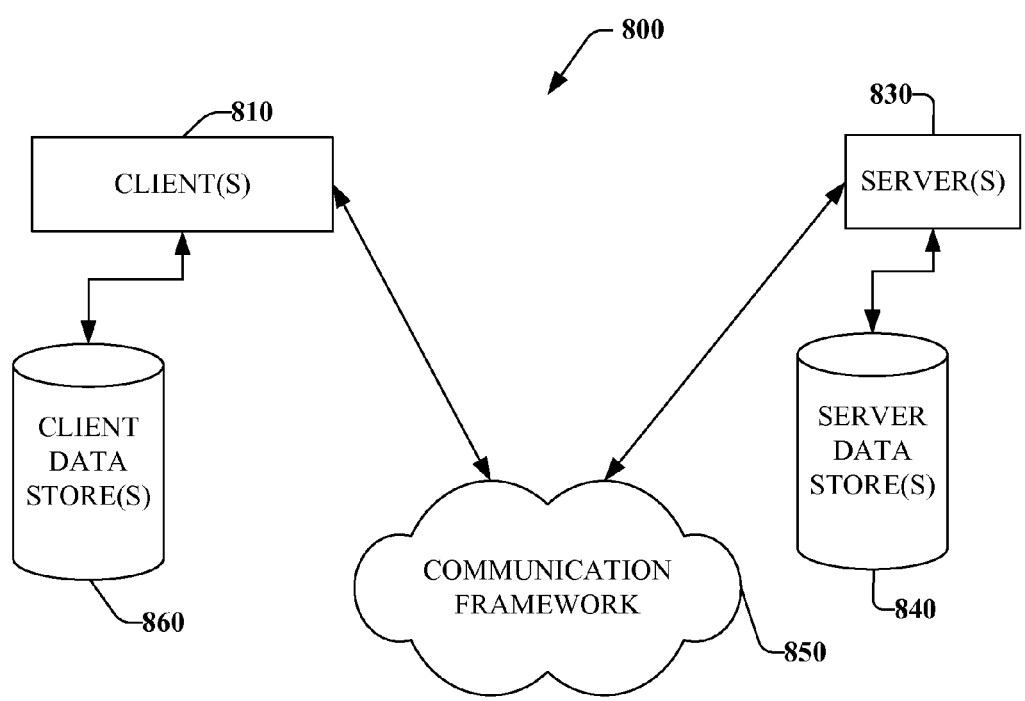
FIG. 8 is an example networking environment.

FIG. 8 is a schematic block diagram of a sample-computing environment 800 with which the disclosed subject matter can interact. The system 1200 includes one or more client(s) 810. The client(s) 810 can be hardware and/or software (e.g., threads, processes, computing devices). The system 800 also includes one or more server(s) 830. The server(s) 830 can also be hardware and/or software (e.g., threads, processes, computing devices). The servers 830 can house threads to perform transformations by employing the subject invention, for example. One possible communication between a client 810 and a server 830 can be in the form of a data packet adapted to be transmitted between two or more computer processes. The system 800 includes a communication framework 850 that can be employed to facilitate communications between the client(s) 810 and the server(s) 830. The client(s) 810 are operably connected to one or more client data store(s) 860 that can be employed to store information local to the client(s) 810. Similarly, the server(s) 830 are operably connected to one or more server data store(s) 840 that can be employed to store information local to the servers 830.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A system that prioritizes energy loads in accordance with a production goal, comprising:
   processor; and
   a memory communicatively coupled to the processor, the memory having stored therein computer-executable instructions configured to implement components the system, the components comprising:
      a policy engine configured to generate goal-based criterion information based on information specifying one or more production goals;
      a load modulation component configured to set load shed priority values for respective load modules corresponding to load devices based on the goal-based criterion information; and
      a feeder module configured to set a threshold value based on the goal-based criterion information, and select a subset of the load devices for transitioning to a low-load state based on a comparison of the threshold value with the load shed priority values,
      wherein the feeder module is further configured to determine an estimated change in a total energy demand of the load devices that will result in response to the at least one of an increment or a decrement of the threshold value, and to initiate the at least one of the increment or the decrement in response to a determination that the estimated change satisfies a criterion.

2. The system of claim 1, wherein the policy engine, the load modulation component, and the feeder module are executable by an industrial controller.

3. The system of claim 1, wherein the components further comprise an interface configured to receive input representing the information specifying the one or more production goals and provide the information to the policy engine.

4. The system of claim 1, wherein the load modulation component is further configured to generate, based on the goal-based criterion information, at least one of load shed schedule information that defines a time for initiating a load shedding or load shed criterion information that defines a condition for initiating the load shedding.

5. The system of claim 4, wherein the load modulation component is further configured to set the threshold value based on at least one of the load shed schedule information or the load shed criterion information.

6. The system of claim 5, wherein the feeder module is further configured to monitor a total energy demand for the load devices and initiate prioritized load shedding for the load devices in accordance with at least one of the load shed schedule information or the load shed criterion information.

7. The system of claim 1, wherein the information specifying the one or more production goals comprises information specifying at least one of a desired target output of a product manufactured by the load devices, a product to be given priority over another product, a maximum peak energy demand for the load devices, a first instruction that product output is to be subservient to energy utilization, or a second instruction that energy utilization is to be subservient to product output.

8. The system of claim 1, wherein the load modulation component is further configured to set the load shed priority values further based on plant-specific information relating to the load devices, wherein the plant-specific information specifies at least one of a product produced by the load devices or an expected amount of energy consumed by the load devices.

9. The system of claim 1, wherein the load modulation component is further configured to set load reset priority values for the respective load modules based on the goal-based criterion information.

10. A method for modulating energy loads in accordance with a production goal, comprising:
    using a processor to facilitate execution of computer-executable instructions stored in a memory to perform acts, the acts comprising: determining a goal-based criterion based on information specifying one or more production goals; configuring load shed priority values for load devices based on the goal-based criterion; setting a threshold value in response to a determination that a load shedding operation is initiated; initiating a low-load state for a subset of the load devices selected based on a comparison between the threshold value and the load shed priority values;
    estimating a change in a total energy demand of the load to result in response to an increment or a decrement of the threshold value; and initiating at least one of the increment or the decrement of the threshold value based on a determination that the change in the total energy demand satisfies a criterion.

11. The method of claim 10, wherein the acts further comprise prioritizing load shedding of a first device of the load devices with respect to a second device of the load devices based on the load shed priority values.

12. The method of claim 10, wherein the acts further comprise prioritizing resetting of a first device of the subset of the load devices after initiation of a load shedding operation with respect to a second load device of the subset of the load devices based on load reset priority values configured for the load devices.

13. The method of claim 10, wherein the acts further comprise generating, based on the goal-based criterion, load shed criterion information that identifies at least one condition for initiating a load shedding operation in accordance with the one or more production goals.

14. The method of claim 13, wherein the acts further comprise:
monitoring a total energy demand for the load devices;
initiating a load shedding operation for the load devices in accordance with the load shed criterion information; and
prioritizing load shedding for the load devices in accordance with the load shed priority value.

15. The method of claim 10, wherein the information specifies at least one of a target output of a product manufactured by the load devices, a product to be given priority over other products, a maximum peak energy demand for the load devices, a first instruction that product output is to be subservient to energy utilization, or a second instruction that energy utilization is to be subservient to product output.

16. The method of claim 10, wherein the acts further comprise configuring load reset priority values for the load devices based on the goal-based criterion.

17. A non-transitory computer-readable medium having stored thereon computer-executable components that, in response to execution, cause a computing device to perform operations, comprising:
generating goal-based criterion information based at least in part on information defining one or more production goals,
configuring respective load shedding priority values for a plurality of load devices in accordance with the goal-based criterion information;
configuring a threshold value based on the one or more production goals;
initiating a command to transition a subset of the plurality of load devices to a low-load state, wherein the subset of the plurality of load devices is selected based on a comparison of the threshold value with the load shedding priority values;
estimating a change in a total energy demand of the plurality of load devices that would result in response to an increment or a decrement of the threshold value; and
in response to determining that a result of the estimating satisfies a criterion, initiating the increment or the decrement.

18. The non-transitory computer-readable medium of claim 17, wherein the information comprises at least one of target information specifying a target output of a product manufactured by at least one of the plurality of load devices, product identification information specifying a product to be given manufacturing priority over another product, peak demand information specifying a maximum peak energy demand for the plurality of load devices, energy preference information indicating that product output is to be subservient to energy consumption, or product output information specifying that energy consumption is to be subservient to product output.

19. The non-transitory computer-readable medium of claim 17, wherein the operations further comprising generating, based on the goal-based criterion information, at least one of load shed schedule information defining a time to initiate load shedding or load shed criterion information defining a condition for initiating load shedding.

20. The non-transitory computer-readable medium of claim 19, wherein the configuring the threshold value comprises configuring the threshold value based on at least one of the load shed schedule information or the load shed criterion information.

* * * * *